(12) United States Patent
Platts

(10) Patent No.: US 7,044,718 B1
(45) Date of Patent: May 16, 2006

(54) RADIAL-RADIAL SINGLE ROTOR TURBINE

(75) Inventor: David A. Platts, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 361 days.

(21) Appl. No.: 10/614,772

(22) Filed: Jul. 8, 2003

(51) Int. Cl.
*F04B 17/00* (2006.01)
*F04B 35/00* (2006.01)

(52) U.S. Cl. .................. 417/405; 415/206; 416/198.8; 416/189; 60/39.43; 60/726; 60/805

(58) Field of Classification Search ............ 60/39.43, 60/805, 804, 726; 417/405–407; 415/206; 416/198.8, 189
See application file for complete search history.

(56) References Cited

U.S. PATENT DOCUMENTS

| | | | |
|---|---|---|---|
| 2,138,220 A | 11/1938 | Trumpler | |
| 2,537,344 A | 1/1951 | Gruss | |
| 2,595,505 A | 5/1952 | Bachle | |
| 2,694,291 A * | 11/1954 | Rosengart | 60/804 |
| 2,748,568 A * | 6/1956 | Budworth | 60/804 |
| 3,077,075 A | 2/1963 | Turanciol | |
| 3,093,084 A | 6/1963 | Derderian | |
| 3,103,325 A | 9/1963 | Leutzinger | |
| 3,130,546 A | 4/1964 | Hovorka | |
| 3,156,093 A | 11/1964 | Chapman | |
| 3,269,120 A * | 8/1966 | Sabatiuk | 60/39.43 |
| 3,709,629 A | 1/1973 | Traut | |
| 3,811,796 A | 5/1974 | Coleman | |
| 3,892,069 A | 7/1975 | Hansford | |
| 3,899,875 A | 8/1975 | Oklejas | |
| 3,940,924 A | 3/1976 | Miyada | |
| 3,958,899 A | 5/1976 | Coleman | |
| 3,999,377 A | 12/1976 | Oklejas | |
| 4,002,414 A | 1/1977 | Coleman | |
| 4,034,560 A | 7/1977 | Chute | |
| 4,051,671 A | 10/1977 | Brewer | |
| 4,070,824 A | 1/1978 | Traut | |
| 4,086,760 A | 5/1978 | Chute | |
| 4,177,638 A | 12/1979 | Wood | |
| 4,463,551 A | 8/1984 | Morris | |
| 4,482,303 A * | 11/1984 | Acosta | 417/406 |
| 4,757,682 A | 7/1988 | Bahniuk | |
| 4,923,370 A | 5/1990 | Larson | |
| 5,035,377 A * | 7/1991 | Buchelt | 244/12.1 |
| 5,185,541 A | 2/1993 | Jensen | |
| 5,207,054 A | 5/1993 | Rodgers | |
| 5,280,703 A | 1/1994 | Corrado | |
| 5,363,644 A | 11/1994 | Shekleton | |
| 5,466,123 A | 11/1995 | Rose | |

(Continued)

OTHER PUBLICATIONS

Franklin Van Den Hout and Joe Koullen, "A Tiny Turbojet For Model Aircraft," Mechanical Engineering, pp. 66-69, Aug. 1997.

(Continued)

*Primary Examiner*—William H. Rodriguez
(74) *Attorney, Agent, or Firm*—Mark N. Fitzgerald

(57) ABSTRACT

A rotor for use in turbine applications has a radial compressor/pump having radially disposed spaced apart fins forming passages and a radial turbine having hollow turbine blades interleaved with the fins and through which fluid from the radial compressor/pump flows. The rotor can, in some applications, be used to produce electrical power.

4 Claims, 4 Drawing Sheets

U.S. PATENT DOCUMENTS

| | | | |
|---|---|---|---|
| 5,584,174 A * | 12/1996 | Bates et al. | 60/791 |
| 5,664,413 A | 9/1997 | Kington | |
| 5,855,112 A | 1/1999 | Bannai | |
| 5,932,940 A | 8/1999 | Epstein | |
| 5,966,927 A * | 10/1999 | Wilson | 60/39.43 |
| 5,996,336 A | 12/1999 | Hamedani | |
| 6,032,458 A * | 3/2000 | James | 60/39.35 |
| 6,062,028 A * | 5/2000 | Arnold et al. | 60/612 |
| 6,430,917 B1 | 8/2002 | Platts | |
| 6,647,707 B1 * | 11/2003 | Dev | 60/39.43 |
| 6,807,802 B1 * | 10/2004 | Platts | 60/39.43 |
| 6,874,998 B1 * | 4/2005 | Roby | 417/407 |
| 6,928,816 B1 * | 8/2005 | Leavesley | 60/602 |
| 2002/0085932 A1 * | 7/2002 | Loffler et al. | 417/407 |
| 2003/0194333 A1 * | 10/2003 | Sumser et al. | 417/407 |
| 2004/0016239 A1 * | 1/2004 | Fabian et al. | 60/805 |
| 2004/0197212 A1 * | 10/2004 | Roby | 417/407 |
| 2005/0175477 A1 * | 8/2005 | Kopp et al. | 417/407 |

OTHER PUBLICATIONS

Richard Sanders, "What Is So Attractive About Micro-Turbines?" Powerline Magazine, pp. 27-34, Dec. 1998.

* cited by examiner

RADIAL-RADIAL SINGLE ROTOR TURBINE

FIELD OF THE INVENTION

The present invention generally relates to turbines and more specifically to rotors used in turbine applications. This invention was made with Government support under Contract No. W-7405-ENG-36 awarded by the U.S. Department of Energy. The Government has certain rights in the invention.

BACKGROUND OF THE INVENTION

Since the earliest use of water to turn a wheel, turbines have provided needed mechanical action for myriad functions. In modern times, turbines are used to generate electricity, power jet aircraft and increase the power of automobiles using turbochargers, as well as in many other uses. Many turbine applications use two rotors on the same shaft so that one turbine powers the other. When the rotors are on a fairly long connecting shaft, problems of balance, shaft whip, and multiple vibrational modes become exacerbated. These problems can cause various troubles up to the failure of the machine.

Smaller turbine engines are now being used for local power generation applications as backup power and for peak shaving. The U.S Department of Energy (DOE) is planning to use similar smaller turbines for distributed energy generation in homes. In these smaller turbines, the turbine blades are not cooled, so the turbine entrance temperatures must be more severely limited to avoid damage. However, in general, the higher the turbine inlet temperature of a turbine engine, the more efficient it is. Therefore, the efficiency of a piece of turbo machinery is determined by the ability of the turbine's nozzles and blades to withstand the heat of the exhaust gases that pass through them.

In larger turbines, it is not unusual to find that approximately one-third of the air moved through them is used for cooling nozzles and blades and not for power production. Prior research has concentrated on developing materials that can withstand higher temperatures for use as turbine parts. However, these higher temperature materials generally are rare and quite expensive. Other research has been in the area of schemes for cooling the components. Likewise, these schemes are costly and inefficient. Present turbine engines of all sizes do not operate anywhere near the theoretical maximum efficiency, and small engines, which lack feasible blade cooling schemes, are less efficient.

Many of the schemes for cooling the blades and bearings of turbine engines have involved using various patterns of cooling channels bored into the blades. For example, U.S. Pat. No. 4,522,562, issued Jun. 11, 1985 to Glowacki and Mandet, discloses a cooling scheme in which a turbine disc has a set of channels bored near each of two sides of a disc that conform with the profile of the disc. Each set of channels carries cooling air to superficially cool the disc.

Other attempts to improve turbine operation have been directed to having turbine wheels or rotors that function as both compressors and turbine sections. A prior art example of this can be found in U.S. Pat. No. 4,757,682, issued Jul. 19, 1988, to Bahniuk. This patent discloses a fluid flow that is directed over the compressor section to effect multiple compression stages, with the same air passages being used for both the compression stages and the exhaust air flow. There is no teaching or suggestion of using separate compression intake and exhaust passages that are interleaved in the same rotor or wheel.

A pair of patents, U.S. Pat. No. 3,709,629, issued Jan. 9, 1973, and related U.S. Pat. No. 4,070,824, issued Jul. 19, 1988, both to Traut, disclose a gas turbine having a rotor that serves as both compressor and turbine. The turbine engine utilizes stationary arcuate members located in close proximity to the rotor that direct the flow of combustion products against the rotor blades to cause rotation. The arcuate members also serve to cool the rotor and provide a path for the subsequent exhausting of the combustion flow. These functions are accomplished by a complex ducting arrangement that is completely different than the present invention. The mixing of the flows, sealing problems, and non standard flow passages are problems in the design of this patent, as we well as the preceding patent.

There is not yet a reliable and practical way to cool the turbine of gas turbine machinery. Multiple rotor turbo machines such as engines, turbochargers, refrigeration compressors, and others all suffer from dynamic problems caused by the shaft and rotor system.

Therefore, it is an object of the present invention to provide a practical turbine blade cooling scheme for small gas turbine machinery.

It is another object of the present invention to provide a single rotor for a gas turbine machine that has better known and studied flow paths than those of the prior art.

It is still another object of the present invention to provide a rotor for turbo machinery that performs the functions of two rotors in only one rotor, thus eliminating the shaft and the problems it introduces.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a rotor for use in turbine applications comprises a radial compressor/pump having radially disposed spaced apart fins forming passages, and a radial turbine having hollow turbine blades through which fluid from the radial compressor/pump flows.

In a further aspect of the present invention, and in accordance with its objects and principles, a turbine engine comprises a turbine engine housing, the turbine engine housing having a compressor outlet volute and a turbine inlet scroll. A single rotor is mounted to a shaft inside the turbine engine housing, the rotor having a radial compressor/pump with axially disposed spaced apart fins forming passages, and a radial turbine having hollow radial turbine blades interleaved with the fins and through which air from the radial compressor/pump flows. Wherein the radial compressor/pump compresses fluid into the compressor outlet volute and heated fluid is directed through the hollow radial turbine blades from the turbine inlet scroll, causing the rotor to rotate.

In a still further aspect of the present invention and in accordance with its objects and principles, a turbine engine comprises a turbine engine housing, the turbine engine housing having a compressor outlet volute and a turbine inlet scroll. A single rotor is mounted to a shaft inside the turbine engine housing, the rotor having a radial compressor/pump with axially disposed spaced apart fins forming passages, and an radial turbine having hollow radial turbine blades interleaved with the fins and through which air from the radial compressor flows. Magnets and windings are positioned on the turbine engine between the turbine engine housing and the single rotor for the production of electrical power. Wherein the radial compressor/pump compresses air into the compressor outlet volute and heated air is directed through the hollow radial turbine blades from the turbine inlet scroll, causing the rotor to rotate and produce electricity.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides an innovative single rotor for use in turbine machines of all types. The invention may be understood most easily through reference to the drawings.

Figure 1:
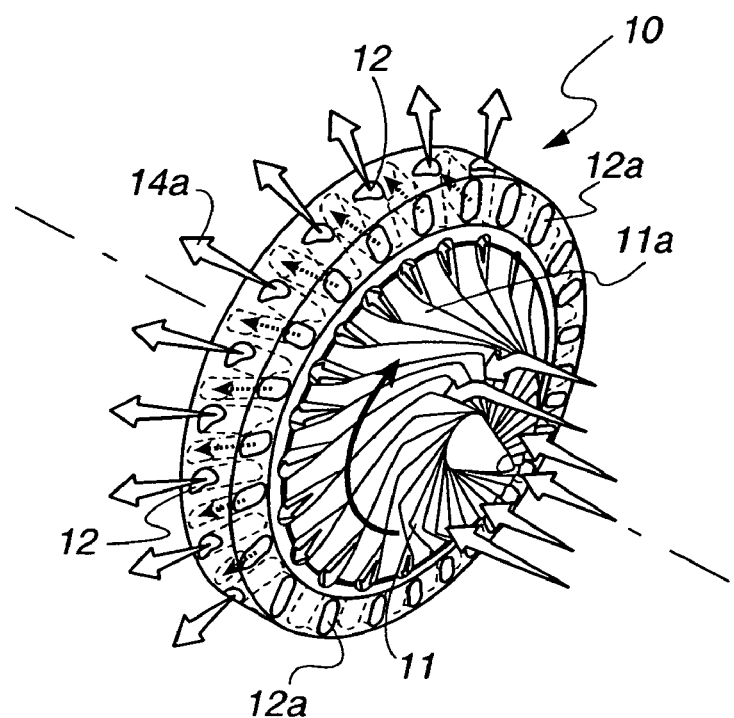
FIG. 1 is a perspective illustration of an embodiment of the invention showing the rotor viewed from the side having the radial compressor and the fluid flows.

Referring now to FIG. 1, there can be seen a perspective view of an embodiment of rotor 10 showing its intake side featuring radial compressor/pump 11 having fins 11a. Fins 11a may either compress incoming fluid flow 14 in some applications, or simply pump incoming fluid flow 14 in other applications, and direct it into compressor ducts 12 that also serve to cool radial turbine blades 12a. In some applications, incoming fluid flow 14 exchanges heat with radial turbine blades 12a as it passes through them. Compressed fluid flow 14a flows out of rotor 10 as shown and into a volute (see FIG. 3) and eventually, after being heated in some applications, compressed fluid flow 14a is directed back through turbine blades 12a of rotor 10.

Those having skill in this art will readily understand that radial compressor/pump 14 is so called because rotor 10 can be used in many diverse applications. Among these applications are situations where fluid flow 14 may be a compressible fluid and situations where fluid flow 14 may be an incompressible fluid. In the case of an incompressible fluid, fins 11a would act as a pump.

Figure 2:
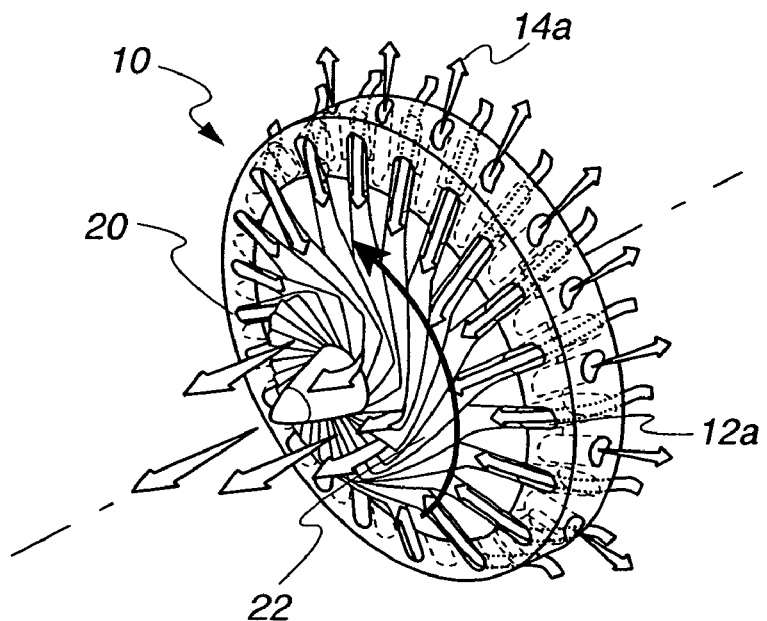
FIG. 2 is a perspective illustration of the embodiment shown in FIG. 1 viewed from the opposite side, showing the radial turbine and the fluid flows.

In FIG. 2, the opposite side of rotor 10, featuring turbine 20, is seen in perspective and shows how compressed fluid flow 14a flowing through radial turbine blades 2a imparts rotation to rotor 10. Compressed fluid flow 14a is directed through radial turbine blades 12a to turbine fins 22 to contribute to the rotation of rotor 10. As one example, in the case of prior art turbine engines, the flow of combustion gasses through the radial turbine blades would transfer heat to the blades, causing them to run at or close to the temperature of the gas. This condition can lead to early turbine failure. When the present invention is used in a turbine engine, due to the interleaving of passages, cooling of radial turbine blades 12a with the airflow from compressor fins 11a (FIG. 1) is provided so that the temperature of the turbine blades 12a is cooler than any combustion gasses driving turbine blades 12a. The heating of the compressed air before input to the combustion chamber using waste heat is also beneficial to the efficiency of a turbine engine.

Figure 3:
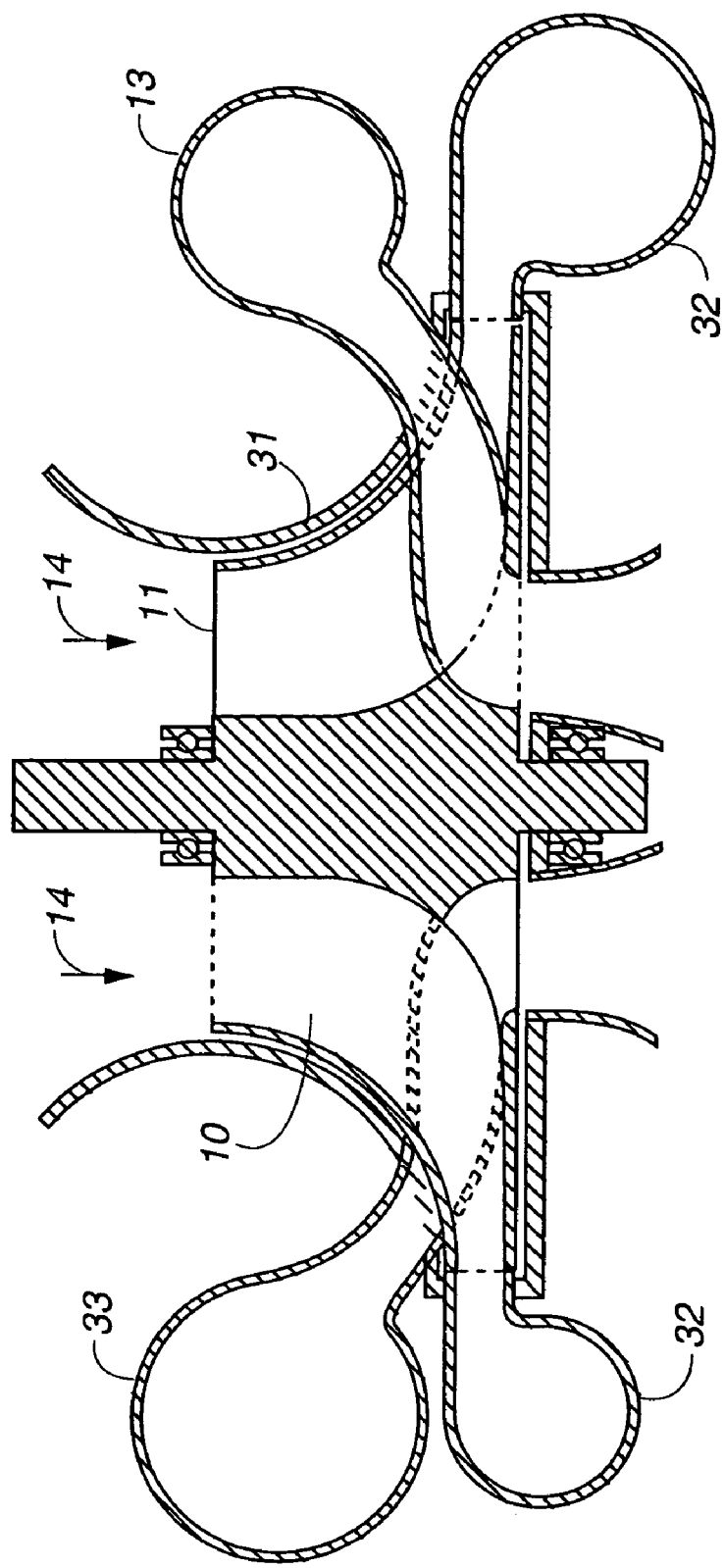
FIG. 3 is a top view of the rotor of the present invention installed in a representative turbomachine.

In FIG. 3, rotor 10 can be seen installed in turbomachine 31, a typical turbomachine. Incoming fluid flow 14 is forced into turbomachine 31 and to radial compressor/pump 11, where it may be compressed and directed into compressor ducts 12 (FIG. 1). From compressor ducts 12, the now compressed fluid flow 14a flows into compressor outlet volute 32. Compressed fluid flow 14a then flows through turbine blades 12b, which exchange heat, in some applications, with compressed fluid flow 14a at it passes through the interior of turbine blades 12a, imparting rotational energy to rotor 10.

Figure 4:
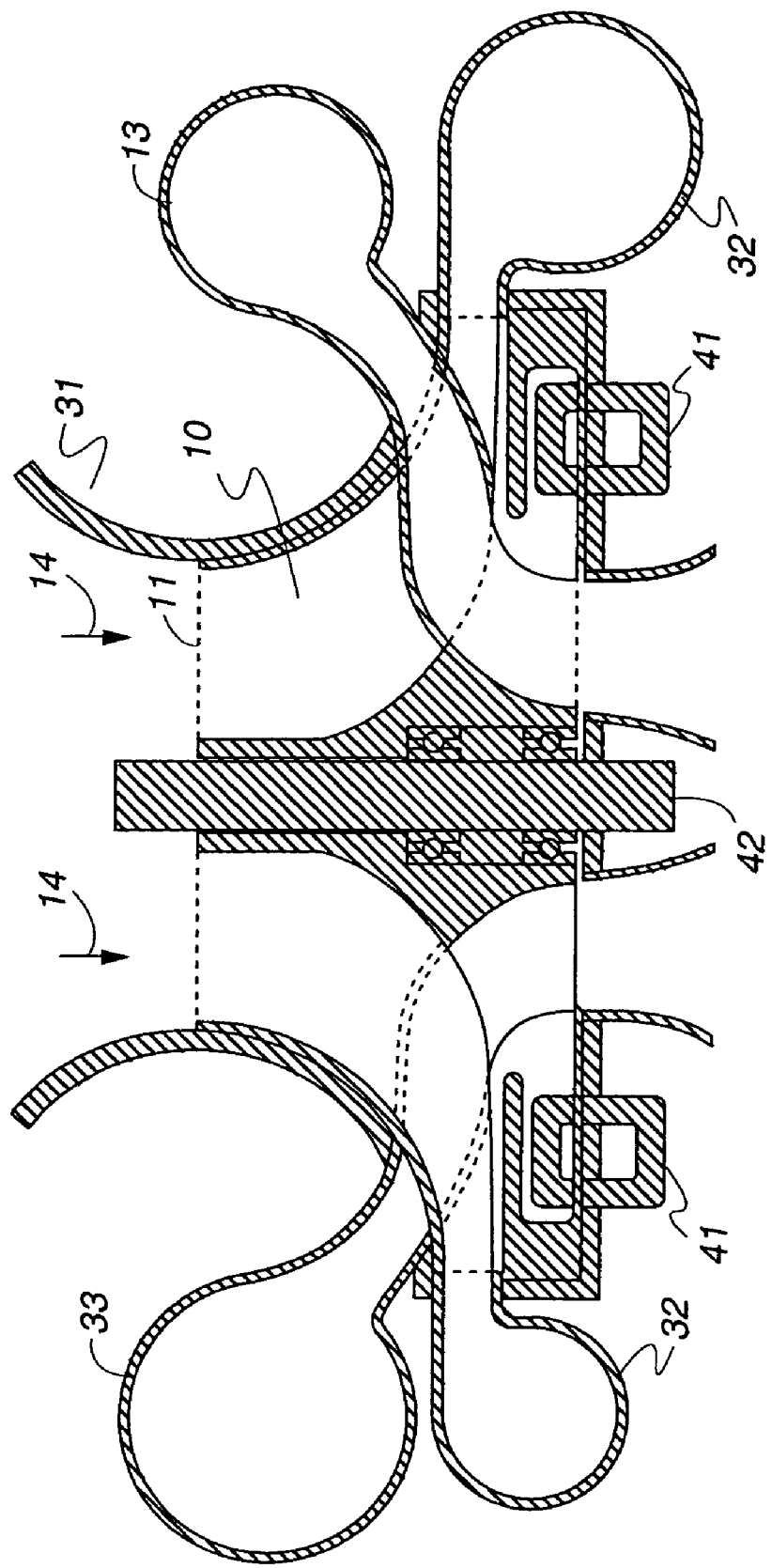
FIG. 4 is a similar view of the rotor of the present invention as shown in FIG. 3, but with magnet and windings installed, for example, on the exhaust side of the turbomachine for the production of electrical power.

Referring now to FIG. 4, there can be seen how the configuration of FIG. 3 can be used to generate electrical power during the operation of rotor 10. As seen in FIG. 4, again which is only a representative configuration, the power generation is capable of being implemented in various ways. Here, for example, magnets and windings 41 could be located at desired locations on the exhaust side of turbomachine 31 used as a gas turbine engine. The magnets can be permanent or electromagnets powered through slip rings (not shown) associated with rotor 42, or powered by induction.

Figure 5:
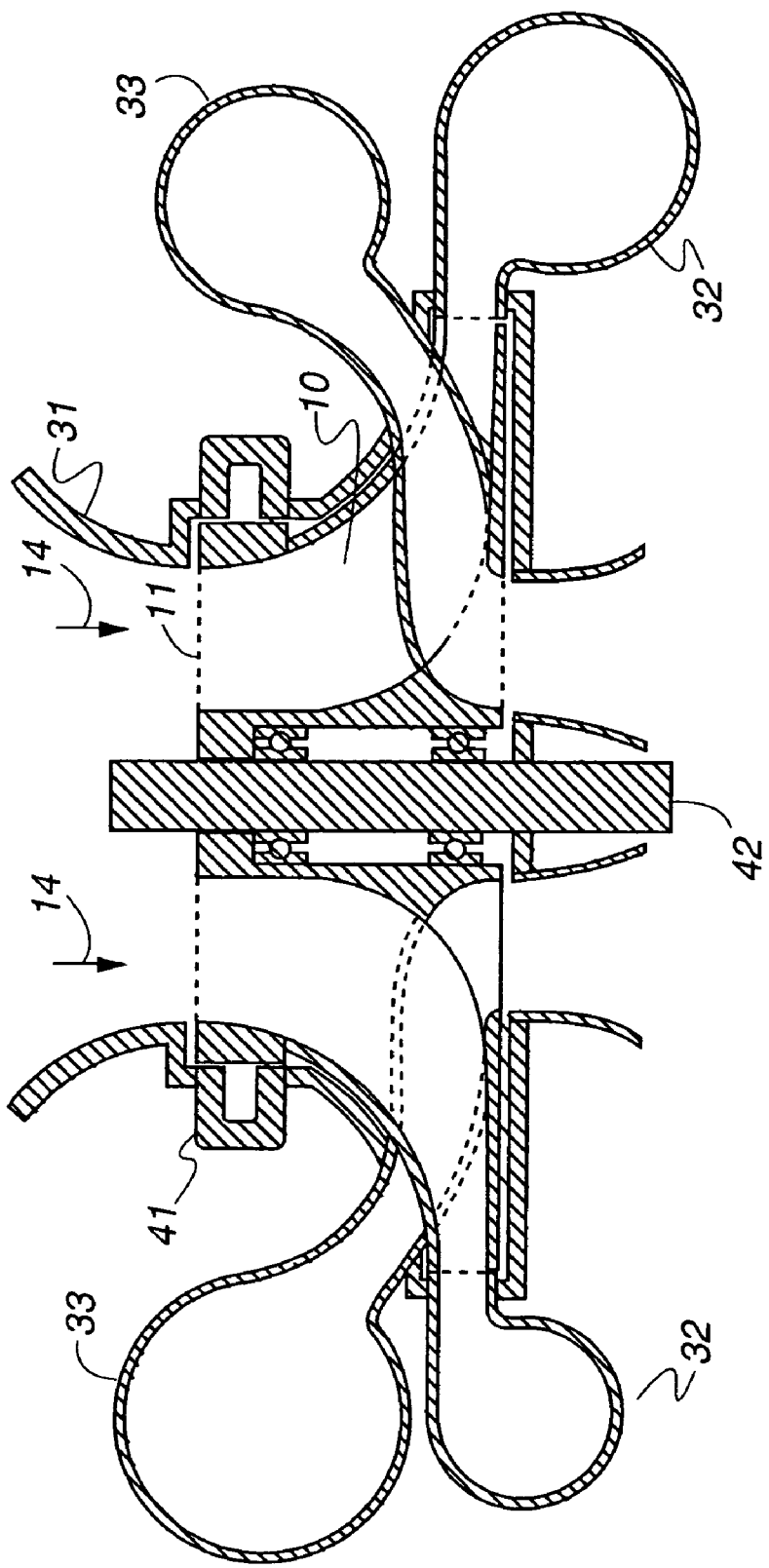
FIG. 5 also is similar to FIG. 3 and to FIG. 4, but with magnet and windings installed, for another example, on the intake side of the turbomachine for the production of electrical power.

FIG. 5 shows another possible location for magnet and windings 41. Here, magnet and windings 41 are located near the air inlet of turbomachine 31 used as a gas turbine engine. It should be noted that most all turbines that are used in electrical power generation must drive a separate generator through a shaft. One of the reasons for this is that conventional turbines operate at such high temperatures that electrical components could not survive. Of course, with a turbine connected to a generator through a shaft, the footprint of the combination is relatively large, especially when compared to the turbine of the present invention.

Once again, it is the cooler running turbine of the present invention that allows the power generation with only normal insulation and heat shielding. The turbine runs at a cool enough temperature to allow the placement of magnet and windings 41 most anywhere on the turbine that allows reasonable accommodations for removal of the electrical power.

Another interesting use of the present invention is as a "turbocharger" for internal combustion engines in cars, trucks and aircraft. In this application, rotor 10 would be powered by the exhaust gasses produced by the engine and provide the compressed air charge to the engine. A turbocharger using rotor 10 should be more compact than present turbochargers, and, since it runs cooler than conventional turbines, would be cheaper and more resistant to failure due to bearing problems.

The present invention provides a rotor 10 that is a single wheel having interleaved flow passages such that rotor 10 functions as both a radial compressor and a radial turbine, and which can be easily configured to produce electrical power. In use as a component of a gas turbine engine, and as previously described, radial passages become the compressor and the turbine blades. The radial turbine is cooled by the flow of intake air through the turbine blades. In turn these passages through the blades form part of the radial compressor. These flows remain separate and their passage shapes conform to standard engineering practice. The passages are large and the rotor can be economically fabricated using conventional techniques such as investment casting.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A rotor for use in turbine applications comprising:
   a radial compressor/pump having spaced apart fins forming passages; and,
   a radial turbine having hollow turbine blades interleaved with said fins and through which fluid from said radial compressor/pump flows.

2. The rotor as described in claim 1 further comprising spaced apart turbine fins for receiving said fluid.

3. A turbine engine comprising:
   a turbine engine housing; and,
   a single rotor mounted to a shaft inside said turbine engine housing, said rotor having a radial compressor/pump with axially disposed spaced apart fins forming passages, and an radial turbine having hollow radial turbine blades interleaved with said fins and through which air from said radial compressor/pump flows.

4. The turbine engine of claim 3, additionally comprising:
   magnets and windings positioned on said turbine engine between said turbine engine housing and said single rotor for the production of electrical power.

* * * * *